US012770503B2

(12) United States Patent
Haag et al.

(10) Patent No.: US 12,770,503 B2
(45) Date of Patent: Oct. 20, 2026

(54) METHOD FOR IDENTIFYING AN AVP MOTOR VEHICLE FOR AN AVP PROCESS

(71) Applicant: Robert Bosch GmbH, Stuttgart-Feuerbach (DE)

(72) Inventors: Patrick Haag, Stuttgart (DE); Sascha Muhlbrandt, Wiernsheim (DE); Sebastian Hahn, Sindelfingen (DE); Leonie Theobald, Sindelfingen (DE); Heidrun Schumacher, Ostelsheim (DE); Mohamed Soliman, Sindelfingen (DE)

(73) Assignee: Robert Bosch GmbH, Stuttgart-Feuerbach (DE)

( * ) Notice: Subject to any disclaimer, the term of this patent is extended or adjusted under 35 U.S.C. 154(b) by 89 days.

(21) Appl. No.: 18/812,730

(22) Filed: Aug. 22, 2024

(65) Prior Publication Data

US 2025/0069497 A1 Feb. 27, 2025

(30) Foreign Application Priority Data

Aug. 22, 2023 (DE) ..................... 10 2023 122 480.8

(51) Int. Cl.
*G08G 1/01* (2006.01)
*G08G 1/00* (2006.01)
*G08G 1/052* (2006.01)
*G08G 1/056* (2006.01)

(52) U.S. Cl.
CPC ........... *G08G 1/0116* (2013.01); *G08G 1/052* (2013.01); *G08G 1/056* (2013.01); *G08G 1/20* (2013.01)

(58) Field of Classification Search
None
See application file for complete search history.

(56) References Cited

U.S. PATENT DOCUMENTS

| | | | | |
|---|---|---|---|---|
| 11,565,691 B2 * | 1/2023 | Ahn | ...................... | B60W 30/06 |
| 2014/0036077 A1 * | 2/2014 | Nerayoff | ................ | G06V 20/62 348/148 |
| 2018/0072345 A1 * | 3/2018 | Nicodemus | .......... | G05D 1/0088 |
| 2021/0197802 A1 * | 7/2021 | Yoon | .................. | B62D 15/0285 |
| 2021/0248386 A1 | 8/2021 | Takato | | |

FOREIGN PATENT DOCUMENTS

| | | |
|---|---|---|
| DE | 102017202065 A1 | 8/2018 |
| WO | 2018145951 A1 | 8/2018 |

* cited by examiner

*Primary Examiner* — Abdhesh K Jha
(74) *Attorney, Agent, or Firm* — Barley Snyder

(57) ABSTRACT

A method for identifying an AVP motor vehicle for an AVP process, wherein a driving behavior of the AVP motor vehicle that is manually guided within a region of a parking area is determined on the motor vehicle side, wherein the driving behavior determined on the motor vehicle side is compared with a driving behavior, determined on the infrastructure side, of a motor vehicle located in the same region of the parking area or a plurality of motor vehicles located in the same region of the parking area in order to identify the AVP motor vehicle. Furthermore a method for identifying an AVP motor vehicle for an AVP process, to a device, to a motor vehicle, to a computer program, to a machine-readable storage medium and to a system for identifying an AVP motor vehicle for an AVP process.

14 Claims, 5 Drawing Sheets

METHOD FOR IDENTIFYING AN AVP MOTOR VEHICLE FOR AN AVP PROCESS

CROSS-REFERENCE TO RELATED APPLICATION

This application claims the benefit of the filing date under 35 U.S.C. § 119(a)-(d) of German Patent Application DE 10 2023 122 480.8, filed on Aug. 22, 2023.

FIELD OF THE INVENTION

The invention relates to a method for identifying an AVP motor vehicle for an AVP process, to a device, to a motor vehicle, to a computer program and to a machine-readable storage medium as well as to a system for identifying an AVP motor vehicle for an AVP process.

BACKGROUND

Automated valet parking (AVP) with infrastructure support guides one or more automated motor vehicles from an external infrastructure through the parking area. To enable this functionality, the infrastructure must identify and localize the individual automated motor vehicles in their area of operation. As soon as an identification is successful, the infrastructure environment sensors localize the identified motor vehicle and guided driving within the parking area can begin.

The abbreviation "AVP" stands for "Automated Valet Parking". An AVP process comprises, for example, at least highly automated guidance of the AVP motor vehicle from a drop zone, also called a drop-off position or drop-off zone, to a parking position and, for example, at least highly automated guidance of the motor vehicle from a parking position to a pick-up position, also called a pick-up zone. At the drop-off position, i.e. the drop zone, a driver of the motor vehicle drops off the motor vehicle for an AVP process. At a pick-up position, i.e. the pick-up zone, the motor vehicle is picked up after the end of the AVP process. An AVP process thus starts in particular at the drop zone. An AVP process thus ends in particular at the pick-up zone. The pick-up zone may be the same as or different from the drop zone.

An AVP motor vehicle is therefore a motor vehicle that may participate in an AVP process.

One option to identify a motor vehicle for an AVP process is to identify the motor vehicle using light code recognition, where the turn signals of the motor vehicle are used as light sources. The details of the identification process are described below.

The AVP motor vehicle is positioned in a drop-off zone or simply a "drop zone" and connects wirelessly to the infrastructure. The infrastructure sends a code to the motor vehicle via a wireless communication interface. The motor vehicle in question will flash the turn signals according to the code. The infrastructure monitors the drop-off zone using cameras and attempts to distinguish the flashing light code in the camera images. If the code is distinguished correctly, the infrastructure can assign its camera images to a specific AVP motor vehicle. This means that the motor vehicle is identified and localized, which means that, among other things, a pose of the motor vehicle is determined.

What is needed is a method for identifying an AVP motor vehicle for an AVP process.

SUMMARY

A method for identifying an AVP motor vehicle for an AVP process, wherein a driving behavior of the AVP motor vehicle that is manually guided within a region of a parking area is determined on the motor vehicle side, wherein the driving behavior determined on the motor vehicle side is compared with a driving behavior, determined on the infrastructure side, of a motor vehicle located in the same region of the parking area or a plurality of motor vehicles located in the same region of the parking area in order to identify the AVP motor vehicle.

Furthermore a method for identifying an AVP motor vehicle for an AVP process, to a device, to a motor vehicle, to a computer program, to a machine-readable storage medium and to a system for identifying an AVP motor vehicle for an AVP process.

BRIEF DESCRIPTION OF THE DRAWINGS

The invention is explained in greater detail below on the basis of preferred exemplary embodiments. In this case.

DETAILED DESCRIPTION OF THE EMBODIMENTS

Figure 1:
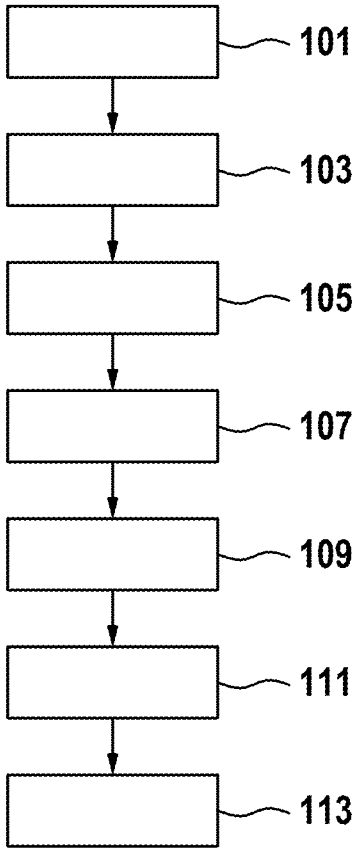
FIG. 1 shows a flowchart of a method according to the first aspect.

The same reference signs may be used for the same features below. The embodiments and exemplary embodiments described here may be combined with one another in any desired way, even if this is not explicitly described.

A first aspect provides a method for identifying an AVP motor vehicle for an AVP process, comprising the following steps:

- infrastructure-side reception of driving behavior data which describe a first driving behavior of an AVP motor vehicle that is manually guided within a region of a parking area monitored by an infrastructure environment sensor system,
- infrastructure-side reception of monitoring data based on the monitoring of the region by the infrastructure environment sensor system,
- infrastructure-side processing of the monitoring data in order to detect on the infrastructure side, based on the monitoring data, a motor vehicle located within the region monitored by the infrastructure environment sensor system,
- in the case of infrastructure-side detection of a motor vehicle located within the region based on the monitoring data, infrastructure-side determination, based on the monitoring data, of a second driving behavior of the motor vehicle detected on the infrastructure side,
- infrastructure-side comparison of the first driving behavior with the second driving behavior, infrastructure-side identification, based on the comparison, of the AVP motor vehicle as the motor vehicle detected on the infrastructure side.

A second aspect provides a method for identifying an AVP motor vehicle for an AVP process, comprising the following steps:

motor-vehicle-side determination of driving behavior data which describe a first driving behavior of the AVP motor vehicle that is manually guided within a region of a parking area monitored by an infrastructure environment sensor system, motor-vehicle-side reception of monitoring data based on the monitoring of the region by the infrastructure environment sensor system, motor-vehicle-side processing of the monitoring data in order to detect on the motor vehicle side, based on the monitoring data, a motor vehicle located within the region monitored by the infrastructure environment sensor system, in the case of motor-vehicle-side detection of a motor vehicle located within the region based on the monitoring data, motor-vehicle-side determination, based on the monitoring data, of a second driving behavior of the motor vehicle detected on the motor vehicle side, motor-vehicle-side comparison of the first driving behavior with the second driving behavior, motor-vehicle-side identification, based on the comparison, of the AVP motor vehicle as the motor vehicle detected on the motor vehicle side.

A third aspect provides a device which is configured to carry out all steps of the method according to the first aspect and/or according to the second aspect.

A fourth aspect provides a motor vehicle which comprises a device according to the third aspect, which is configured to carry out all steps of the method according to the second aspect.

A fifth aspect provides a computer program comprising instructions which, when the computer program is executed by a computer, for example by the device according to the third aspect, cause the latter to carry out a method according to the first aspect and/or according to the second aspect.

A sixth aspect provides a machine-readable storage medium on which the computer program according to the fifth aspect is stored.

A seventh aspect provides a system for identifying an AVP motor vehicle for an AVP process, said system comprising a device according to the third aspect, which is configured to carry out all steps of the method according to the first aspect, and an infrastructure environment sensor system which is configured to monitor a region of a parking area and to output monitoring data based on the monitoring to the device.

The invention is based on and includes the knowledge that the above problem is solved by a driving behavior determined by the AVP motor vehicle itself (first driving behavior) being compared with a driving behavior, determined on the infrastructure side (second driving behavior or further driving behavior), of a motor vehicle located in the same region of the parking area or a plurality of motor vehicles located in the same region of the parking area in order to identify the AVP motor vehicle.

The above problem is thus solved in particular by an alignment of the relative movement (driving behavior) recorded by the AVP motor vehicle with the driving behavior determined on the infrastructure side, which is determined on the infrastructure side based on the monitoring data, wherein the region within which the AVP motor vehicle is located is monitored by the infrastructure environment sensor system, while the driver still controls the movement of the AVP motor vehicle manually. The infrastructure environment sensor system outputs corresponding monitoring data based on the monitoring.

Vehicle movements are characterized in particular by the vehicle position and the change in position over time. This movement is measured by the AVP motor vehicle for example using its internal odometry. The same movement is measured or recorded by the infrastructure by way of the infrastructure environment sensor system.

The data required for the alignment of the movement are exchanged, for example, via a wireless interface on the infrastructure side or on the motor vehicle side. Either the AVP motor vehicle or the infrastructure, or both, analyze the driving behavior determined in each case and attempt to align them. For example, as soon as a correlation is found, the AVP motor vehicle is identified as the motor vehicle whose driving behavior determined on the infrastructure side corresponds to the driving behavior determined by the AVP motor vehicle itself. After successful identification, for example, the identified AVP motor vehicle is localized.

Localization in the sense of the description is in particular a positioning of the motor vehicle in an absolute or relative coordinate system. This includes the orientation in which the motor vehicle has been parked (initial pose). Localization thus includes in particular determining a pose of the motor vehicle.

The concept described here has the following advantages in particular:

The motor vehicle identification and in particular the motor vehicle localization can advantageously take place as early as during the manually guided drive through the parking area, that is to say even before the driver has left the AVP motor vehicle. As a result, the AVP motor vehicle is already identified for example when the driver reaches the drop-off zone. This eliminates a waiting time for motor vehicle identification in the drop-off zone, for example. This benefits the driver and increases the potential flow of AVP motor vehicles for an AVP process. For example, the odometry of the AVP motor vehicle and the infrastructure environment sensor system can both have a high measuring rate. Therefore, little measurement data may be sufficient to enable a clear identification of the AVP motor vehicle among a number of other motor vehicles. The identification process is advantageously invisible from the outside.

Another advantage of the concept is for example that an AVP process can be initialized more quickly, as there is no additional waiting time required for flashing for the purpose of identification.

Another advantage of the concept is for example that an AVP process can be initialized invisibly. For example, the initialization is not visible to the user.

Another advantage of the concept is for example that manual confirmation that the user is in the drop zone can be omitted.

Another advantage of the concept is for example that the recognition that an AVP motor vehicle is in the drop zone can thus be more reliable than via manual confirmation, since a user could provide confirmation even when they are not in the drop zone. The AVP motor vehicle would then flash unnecessarily according to the procedure described in the introduction to the description.

An advantage of the method according to the second aspect is for example that the AVP motor vehicle can verify that it is located within the parking area and has been recognized by the infrastructure. This may be beneficial for certain types of AVP processes where more responsibility lies with the AVP motor vehicles, that is to say for example AVP motor vehicles have to locate themselves, for example.

A parking area within the meaning of the description may also be referred to as a parking space and serves for example as a space for vehicles to park. In particular, the parking area thus forms a contiguous area which comprises a plurality of parking places (in the case of a parking area on private land) or parking zones (in the case of a parking area on public land) and connecting roads. The parking area may be comprised by a parking garage according to one embodiment.

In one embodiment of the method according to the first aspect, provision is made, in the case of infrastructure-side detection of a plurality of motor vehicles located within the region based on the monitoring data, for a respective driving behavior of the plurality of motor vehicles detected on the infrastructure side to be determined on the infrastructure side based on the monitoring data, wherein the respective driving behaviors are in each case compared on the infrastructure side with the first driving behavior, wherein, based on the respective comparisons, the AVP motor vehicle is identified on the infrastructure side as one of the plurality of motor vehicles detected on the infrastructure side.

For example, this affords the technical advantage that the AVP motor vehicle can also be identified from several motor vehicles.

In one embodiment of the method according to the first aspect, provision is made, based on the comparison on the infrastructure side, for a difference between the first driving behavior and the respective driving behavior of a motor vehicle detected on the infrastructure side to be determined on the infrastructure side, wherein, based on the determined difference, the AVP motor vehicle is identified on the infrastructure side as a motor vehicle detected on the infrastructure side.

For example, this affords the technical advantage that the AVP motor vehicle can be identified easily.

In one embodiment of the method according to the first aspect, provision is made for a time profile of the determined difference to be determined on the infrastructure side, wherein, based on the determined time profile of the determined difference, the AVP motor vehicle is identified on the infrastructure side as a motor vehicle detected on the infrastructure side.

For example, this affords the technical advantage that the AVP motor vehicle can be identified reliably.

In one embodiment of the method according to the first aspect, provision is made for the AVP motor vehicle to be identified on the infrastructure side as a motor vehicle detected on the infrastructure side if the time profile of the determined difference remains within a predetermined tolerance interval for a predetermined time.

For example, this affords the technical advantage that the AVP motor vehicle can be identified reliably.

In one embodiment of the method according to the first aspect, provision is made for the AVP motor vehicle to be identified on the infrastructure side as a motor vehicle detected on the infrastructure side if the determined difference is less than or less than or equal to a predetermined difference threshold value.

For example, this affords the technical advantage that the AVP motor vehicle can be identified reliably.

In one embodiment of the method according to the first aspect, provision is made for the driving behavior to be described by at least one of the following driving behavior parameters: location, speed, acceleration, jolt, pose, orientation, curvature of a motor vehicle trajectory, time profile of the location, time profile of the speed, time profile of the acceleration, time profile of the jolt, time profile of the pose, time profile of the orientation, time profile of a motor vehicle trajectory.

For example, this affords the technical advantage that the driving behavior is described by suitable and meaningful driving behavior parameters.

In one embodiment of the method according to the first aspect, provision is made for the difference determined on the infrastructure side to be a respective difference between the corresponding driving behavior parameters describing the respective driving behavior.

For example, this affords the technical advantage that particularly suitable and meaningful differences can be determined.

In one embodiment of the method according to the first aspect, provision is made, in the case of identification on the infrastructure side of the AVP motor vehicle as a motor vehicle detected on the infrastructure side, for a confidence for the identification to be determined on the infrastructure side, wherein, based on the determined confidence, a different identification method is carried out on the infrastructure side in order to re-identify the AVP motor vehicle as the motor vehicle detected on the infrastructure side.

For example, this affords the technical advantage that the AVP motor vehicle can be identified reliably.

For example, another identification method involves one or more of the following steps: identification of the AVP motor vehicle using light code recognition, wherein the turn signals of the AVP motor vehicle are used as a light source. A code is sent on the infrastructure side to the AVP motor vehicle via a wireless communication interface. The AVP motor vehicle will flash the turn signals according to the code. On the infrastructure side, the infrastructure environment sensor system monitors the region, where the monitoring data corresponding to said monitoring are processed on the infrastructure side in order to detect or recognize the flashing light code in the monitoring data. If the code is correctly recognized or detected on the infrastructure side, the corresponding monitoring data, in particular camera images, are assigned to the AVP motor vehicle. This means that the AVP motor vehicle is identified and in particular localized.

In one embodiment of the method according to the first aspect, provision is made for the driving behavior data to be received on the infrastructure side from the AVP motor vehicle via a radio connection with the AVP motor vehicle and/or wherein the driving behavior data are received on the infrastructure side from a backend.

For example, upon reception via the radio communication, this affords the technical advantage that the driving behavior data can be quickly received on the infrastructure side.

An advantage in receiving the driving behavior data via the backend is in particular that it can first be determined on the infrastructure side that the AVP motor vehicle is located within the parking area before the AVP motor vehicle establishes a direct connection, that is to say a radio connection, with the infrastructure.

A backend is for example a backend of a manufacturer of the motor vehicle. For example, the driving behavior data is received from the AVP motor vehicle via one or more radio connections with the AVP motor vehicle. A radio connection is for example a WLAN connection or a mobile radio connection.

Provision can therefore be made for the motor vehicle to send the driving behavior data directly to the infrastructure via one or more radio connections. As an alternative or in addition, provision can therefore be made for the motor vehicle to send the driving behavior data to the backend, which sends the driving behavior data to the infrastructure.

For example, sending and receiving is sending and receiving via one or more communication networks. For example, a communication network is a WLAN network or a mobile radio network. For example, a communication network is the Internet.

In one embodiment of the method according to the second aspect, provision is made, in the case of motor-vehicle-side detection of a plurality of motor vehicles located within the region based on the monitoring data, for a respective driving behavior of the plurality of motor vehicles detected on the motor vehicle side to be determined on the motor vehicle side based on the monitoring data, wherein the respective driving behaviors are in each case compared on the motor vehicle side with the first driving behavior, wherein, based on the respective comparisons, the AVP motor vehicle is identified on the motor vehicle side as one of the plurality of motor vehicles detected on the motor vehicle side.

For example, this affords the technical advantage that the AVP motor vehicle can also be identified from several motor vehicles.

In one embodiment of the method according to the second aspect, provision is made, based on the comparison on the motor vehicle side, for a difference between the first driving behavior and the respective driving behavior of a motor vehicle detected on the motor vehicle side to be determined on the motor vehicle side, wherein, based on the determined difference, the AVP motor vehicle is identified on the motor vehicle side as a motor vehicle detected on the motor vehicle side.

For example, this affords the technical advantage that the AVP motor vehicle can be identified easily.

In one embodiment of the method according to the second aspect, provision is made for a time profile of the determined difference to be determined on the motor vehicle side, wherein, based on the determined time profile of the determined difference, the AVP motor vehicle is identified on the motor vehicle side as a motor vehicle detected on the motor vehicle side.

For example, this affords the technical advantage that the AVP motor vehicle can be identified reliably.

In one embodiment of the method according to the second aspect, provision is made for the AVP motor vehicle to be identified on the motor vehicle side as a motor vehicle detected on the motor vehicle side if the time profile of the determined difference remains within a predetermined tolerance interval for a predetermined time.

For example, this affords the technical advantage that the AVP motor vehicle can be identified reliably.

In one embodiment of the method according to the second aspect, provision is made for the AVP motor vehicle to be identified on the motor vehicle side as a motor vehicle detected on the motor vehicle side if the determined difference is less than or less than or equal to a predetermined difference threshold value.

For example, this affords the technical advantage that the AVP motor vehicle can be identified reliably.

In one embodiment of the method according to the second aspect, provision is made for the driving behavior to be described by at least one of the following driving behavior parameters: location, speed, acceleration, jolt, pose, orientation, curvature of a motor vehicle trajectory, time profile of the location, time profile of the speed, time profile of the acceleration, time profile of the jolt, time profile of the pose, time profile of the orientation, time profile of a motor vehicle trajectory.

For example, this affords the technical advantage that the driving behavior is described by suitable and meaningful driving behavior parameters.

In one embodiment of the method according to the second aspect, provision is made for the difference determined on the motor vehicle side to be a respective difference between the corresponding driving behavior parameters describing the respective driving behavior.

For example, this affords the technical advantage that particularly suitable and meaningful differences can be determined.

In one embodiment of the method according to the second aspect, provision is made, in the case of identification on the motor vehicle side of the AVP motor vehicle as a motor vehicle detected on the motor vehicle side, for a confidence for the identification to be determined on the infrastructure side, wherein, based on the determined confidence, a different identification method is carried out on the motor vehicle side in order to re-identify the AVP motor vehicle as the motor vehicle detected on the motor vehicle side.

For example, this affords the technical advantage that the AVP motor vehicle can be identified reliably.

In one embodiment of the method according to the second aspect, provision is made for the driving behavior data to be sent on the motor vehicle side via a radio connection, for example to a backend and/or for example to an infrastructure of the parking area.

For example, upon sending via a radio communication, this affords the technical advantage that the driving behavior data can be quickly received by the infrastructure.

An advantage in sending the driving behavior data to the backend is in particular that the backend can send the driving behavior data to the infrastructure so that the infrastructure can first determine on the infrastructure side that the AVP motor vehicle is located within the parking area before the AVP motor vehicle establishes on the motor vehicle side a direct connection, that is to say a radio connection, with the infrastructure.

Statements made in connection with the method according to the first aspect apply analogously to the method according to the second aspect and vice versa. This means that method features of the method according to the second aspect result from corresponding method features of the method according to the first aspect with the modification that the corresponding method features are carried out on the motor vehicle side.

The method according to the first aspect and/or the method according to the second aspect is or are, for example, computer-implemented methods.

A method in the sense of the description can be carried out, for example, by way of the corresponding device and/or by way of the corresponding system.

The abbreviation "AVP" stands for "Automated Valet Parking". An AVP process comprises, for example, at least highly automated guidance of the AVP motor vehicle from a drop zone, also called a drop-off position or drop-off zone, to a parking position and, for example, at least highly automated guidance of the motor vehicle from a parking position to a pick-up position, also called a pick-up zone. At the drop-off position, i.e. the drop zone, a driver of the motor vehicle drops off the motor vehicle for an AVP process. At a pick-up position, i.e. the pick-up zone, the motor vehicle is picked up after the end of the AVP process. An AVP process thus starts in particular at the drop zone. An AVP process thus ends in particular at the pick-up zone. The pick-up zone may be the same as or different from the drop zone.

An AVP motor vehicle is therefore a motor vehicle that may participate in an AVP process.

The AVP motor vehicle is an at least highly automated motor vehicle. Such a motor vehicle is configured for at least highly automated guidance or driving. Highly automated guidance corresponds to an automation level 3 as defined by the German Federal Highway Research Institute (BASt).

The fact that the motor vehicle is configured at least for highly automated guidance includes the case where the motor vehicle is configured for highly automated guidance as well as for fully automated guidance and for autonomous guidance. Fully automated guidance corresponds to an automation level 4 as defined by the BASt.

Highly automated guidance means that, for a certain period of time in a specific situation (for example: driving on an interstate highway, driving within a parking area, overtaking an object, driving within a lane defined by lane markings), longitudinal and lateral guidance of the motor vehicle are controlled automatically. A driver of the motor vehicle does not themself have to manually control the longitudinal and lateral guidance of the motor vehicle. The driver does not have to continuously monitor the automatic control of the longitudinal and lateral guidance in order to be able to intervene manually if necessary. If necessary, a takeover request to take over the control of the longitudinal and lateral guidance is automatically output to the driver, in particular with a sufficient time reserve. This means that the driver must potentially be able to take over the control of the longitudinal and lateral guidance. Limits of the automatic control of the lateral and longitudinal guidance are automatically recognized. With highly automated guidance, it is not possible to automatically bring about a risk-minimized state in every initial situation.

Fully automated guidance means that, in a specific situation (for example: driving on an interstate highway, driving within a parking area, overtaking an object, driving within a lane defined by lane markings), longitudinal and lateral guidance of the motor vehicle are controlled automatically. A driver of the motor vehicle does not themself have to manually control the longitudinal and lateral guidance of the motor vehicle. The driver does not have to monitor the automatic control of the longitudinal and lateral guidance in order to be able to intervene manually if necessary. Before the automatic control of the lateral and longitudinal guidance is stopped, the driver is automatically prompted to take over the driving task (control of the lateral and longitudinal guidance of the motor vehicle), in particular with a sufficient time reserve. If the driver does not take over the driving task, there is an automatic return to a risk-minimized state. Limits of the automatic control of the lateral and longitudinal guidance are automatically recognized. In all situations, it is possible to automatically return to a risk-minimized system state.

Autonomous guidance or driving means that longitudinal and lateral guidance of the motor vehicle are controlled automatically in all situations and not just in one or more specific situations. The driver is no longer necessary as a fallback level. The motor vehicle may therefore drive in driverless fashion. Autonomous guidance corresponds to an automation level 5 according to SAE (J3016), where SAE stands for "Society of Automotive Engineers".

An infrastructure environment sensor system comprises, for example, one or more environment sensors which are spatially distributed for example within the infrastructure, that is to say the parking area. The infrastructure environment sensor system monitors one or more regions of the parking area. If the singular is used for the region, the plural should always be jointly read and vice versa. In particular, this means that statements made in connection with one region apply analogously to several regions and vice versa. The environment sensors of the infrastructure environment sensor system monitor a region of the parking area, thus capturing the region. The infrastructure environment sensor system or the environment sensors, for example, outputs or output monitoring data based on the monitoring or capturing. Said monitoring data represent or describe the monitored region.

An environment sensor within the meaning of the description is for example one of the following environment sensors: radar sensor, image sensor, in particular image sensor of a video camera, for example image sensor(s) of a stereo video camera, ultrasonic sensor, LiDAR sensor, magnetic field sensor and infrared sensor.

The short term "at least one" means "one or more".

In one embodiment of the method according to the first aspect, provision is made, in the case of positive identification, on the infrastructure side, of the AVP motor vehicle as a motor vehicle detected on the infrastructure side, for this result to be transmitted on the infrastructure side to the AVP motor vehicle via a radio connection in order to verify the identification, on the infrastructure side, by the AVP motor vehicle.

In one embodiment of the method according to the second aspect, provision is made, in the case of positive identification, on the motor vehicle side, of the AVP motor vehicle as a motor vehicle detected on the motor vehicle side, for this result to be transmitted on the motor vehicle side to the infrastructure via a radio connection in order to verify the identification, on the motor vehicle side, by the infrastructure.

For example, a result of the corresponding verification is sent back to the sender.

For example, the AVP process only starts after positive identification or only after positive verification of the identification on the motor vehicle side or infrastructure side.

For example, the region of the parking area includes one or more drop zones.

The embodiments and exemplary embodiments described here may be combined with one another in any desired way, even if this is not explicitly described.

The device according to the third aspect and/or the system for identifying an AVP motor vehicle for an AVP process is or are for example configured in terms of programming to execute the computer program according to the fifth aspect.

FIG. 1 shows a flowchart of a method for identifying an AVP motor vehicle for an AVP process, comprising the following steps:

- infrastructure-side reception 101 of driving behavior data which describe a first driving behavior of an AVP motor vehicle that is manually guided within a region of a parking area monitored by an infrastructure environment sensor system,
- infrastructure-side reception 103 of monitoring data based on the monitoring of the region by the infrastructure environment sensor system,
- infrastructure-side processing 105 of the monitoring data in order to detect on the infrastructure side, based on the monitoring data, a motor vehicle located within the region monitored by the infrastructure environment sensor system,
- in the case of infrastructure-side detection 107 of a motor vehicle located within the region based on the monitoring data, infrastructure-side determination 109, based on the monitoring data, of a second driving behavior of the motor vehicle detected on the infrastructure side, infrastructure-side comparison 111 of the first driving behavior with the second driving behavior, infrastructure-side identification 113, based on the comparison, of the AVP motor vehicle as the motor vehicle detected on the infrastructure side.

Figure 2:
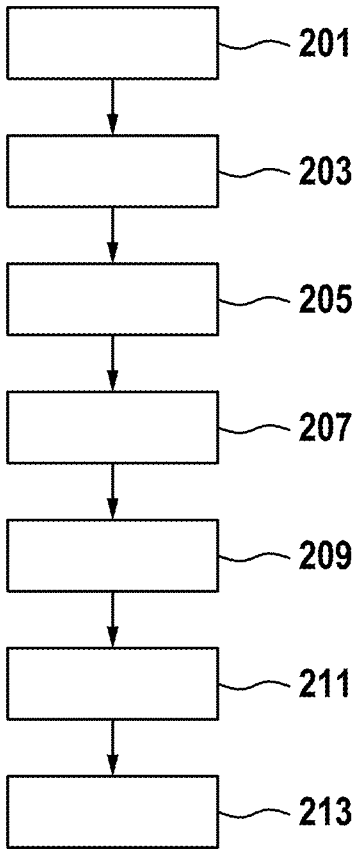
FIG. 2 shows a flowchart of a method according to the second aspect.

FIG. 2 shows a flowchart of a method for identifying an AVP motor vehicle for an AVP process, comprising the following steps:

motor-vehicle-side determination 201 of driving behavior data which describe a first driving behavior of the AVP motor vehicle that is manually guided within a region of a parking area monitored by an infrastructure environment sensor system, motor-vehicle-side reception 203 of monitoring data based on the monitoring of the region by the infrastructure environment sensor system, motor-vehicle-side processing 205 of the monitoring data in order to detect on the motor vehicle side, based on the monitoring data, a motor vehicle located within the region monitored by the infrastructure environment sensor system, in the case of motor-vehicle-side detection 207 of a motor vehicle located within the region based on the monitoring data, motor-vehicle-side determination 209, based on the monitoring data, of a second driving behavior of the motor vehicle detected on the motor vehicle side, motor-vehicle-side comparison 211 of the first driving behavior with the second driving behavior, motor-vehicle-side identification 213, based on the comparison, of the AVP motor vehicle as the motor vehicle detected on the motor vehicle side.

Figure 3:
FIG. 3 shows a device according to the third aspect.

FIG. 3 shows a device 301 which is configured to carry out all steps of the method according to the first aspect and/or according to the second aspect.

Figure 4:
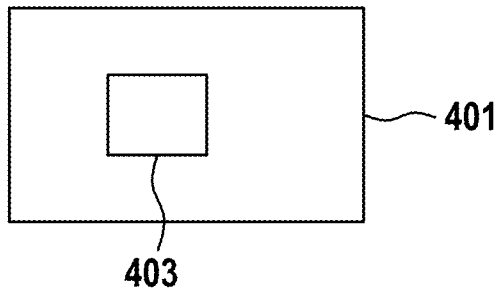
FIG. 4 shows a machine-readable storage medium according to the sixth aspect.

FIG. 4 shows a machine-readable storage medium 401 on which a computer program 403 is stored. The computer program 403 comprises instructions which, when the computer program 403 is executed by a computer, cause the latter to carry out a method according to the first aspect and/or according to the second aspect.

Figure 5:
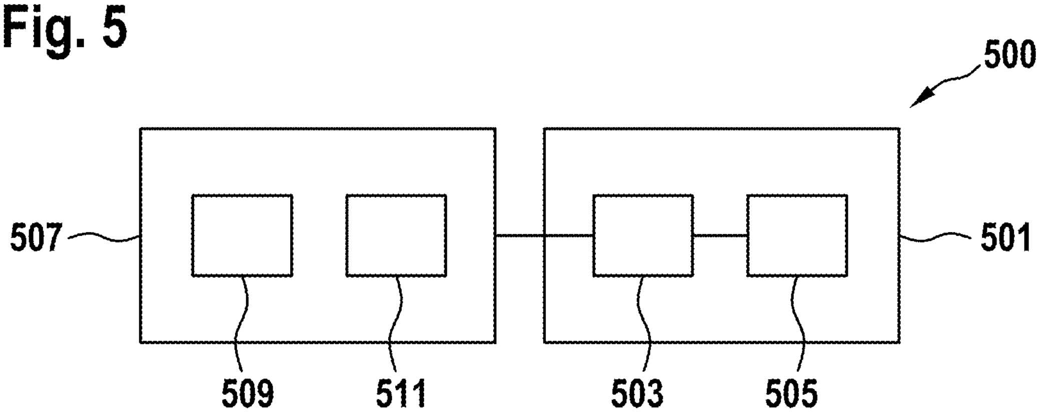
FIG. 5 shows a system for identifying an AVP motor vehicle for an AVP process.

FIG. 5 shows a system 500 for identifying an AVP motor vehicle for an AVP process.

The system 500 comprises a device 501 which is configured to carry out all steps of the method according to the first aspect. The device 501 comprises a communication unit 503 which is configured to carry out the infrastructure-side reception steps. The communication unit 503 is thus configured to receive the driving behavior data on the infrastructure side and to receive the monitoring data on the infrastructure side. The communication unit 503 is configured for example to send a result of the identification of the motor vehicle on the infrastructure side as the motor vehicle detected on the infrastructure side to the AVP motor vehicle.

The device 501 comprises a processor unit 505 which for example may comprise one or more processors. The processor unit 505 is configured to process the monitoring data on the infrastructure side in order to detect on the infrastructure side, based on the monitoring data, a motor vehicle located within the region monitored by the infrastructure environment sensor system. The processor unit 505 is configured to carry out the step of determining on the infrastructure side, based on the monitoring data, a second driving behavior of the motor vehicle detected on the infrastructure side. The processor unit 505 is thus configured to determine on the infrastructure side, based on the monitoring data, a second driving behavior of the motor vehicle detected on the infrastructure side. The processor unit 505 is configured to compare the first driving behavior with the second driving behavior on the infrastructure side. The processor unit 505 is configured to identify on the infrastructure side the AVP motor vehicle as the motor vehicle detected on the infrastructure side based on the comparison.

The system 505 comprises an infrastructure environment sensor system 507 which comprises one or more environment sensors. As an example, the infrastructure environment sensor system 507 comprises a first environment sensor 509 and a second environment sensor 511. In an embodiment which is not shown, the infrastructure environment sensor system 507 comprises more than the two environment sensors 509, 511 or fewer than two environment sensors 509, 511. The infrastructure environment sensor system 507 monitors a region of the parking area and outputs monitoring data corresponding to or based on the monitoring, in this case to the device 501. This means in particular that the infrastructure environment sensor system 507 sends the monitoring data to the communication unit 503 of the device 501. The communication unit 503 receives the monitoring data from the infrastructure environment sensor system 507.

The communication unit 503 comprises for example one or more communication interfaces. A communication interface is for example a WLAN communication interface or is for example a mobile radio communication interface or is for example an Ethernet communication interface.

Figure 6:
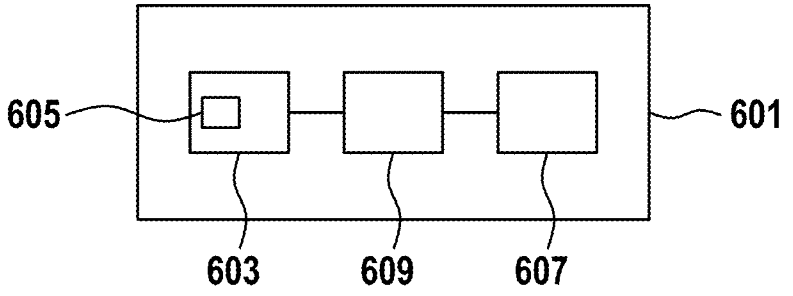
FIG. 6 shows a device.

FIG. 6 shows a device 601 which is configured to carry out all steps of the method according to the second aspect. The device 601 comprises a determination unit 603 which is configured to determine the driving behavior data on the motor vehicle side. The determination unit 603 comprises an odometry system 605 which is configured to determine odometric data of the motor vehicle. For example, the odometry system 605 comprises one or more odometry sensors.

The device 601 comprises a communication unit 607 which is configured to receive the monitoring data on the motor vehicle side. The device 601 comprises a processor unit 609 which for example may comprise one or more processors. The processor unit 609 is configured to process the monitoring data on the motor vehicle side and to determine on the motor vehicle side, based on the monitoring data, a second driving behavior of the motor vehicle detected on the motor vehicle side when a motor vehicle located within the region is detected. The processor unit 609 is configured to compare the first driving behavior with the second driving behavior on the motor vehicle side. The processor unit 609 is configured to identify on the motor vehicle side, based on the comparison, the AVP motor vehicle as the motor vehicle detected on the motor vehicle side.

The device 601 is for example comprised by a motor vehicle (not shown). For example, the motor vehicle is an AVP motor vehicle.

Figure 7:
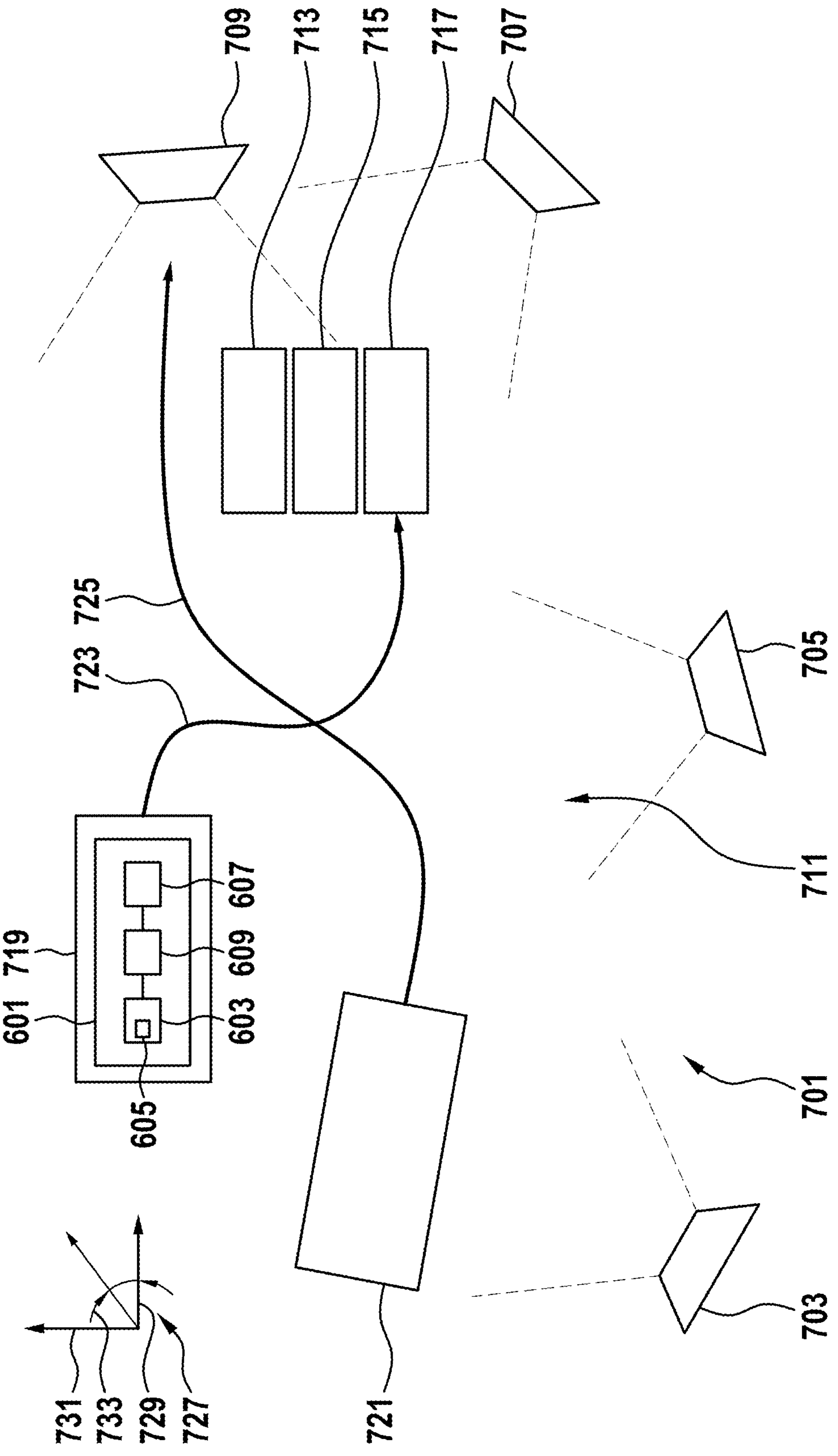
FIG. 7 shows a parking area and FIG. 8 shows a time profile of motor vehicle speeds.

FIG. 7 shows a parking area 701, within which a first environment sensor 703, a second environment sensor 705, a third environment sensor 707 and a fourth environment sensor 709 are spatially distributed. The four environment sensors 703 to 709 monitor a region 711 of the parking area 701. The region 711 comprises a first drop zone 713, a second drop zone 715 and a third drop zone 717.

An AVP motor vehicle 719 comprising the device 601 of FIG. 6 is guided manually by a driver (not shown) within the region 711. The driver of the AVP motor vehicle 719 wishes to park their AVP motor vehicle in the third drop zone 717, and so an AVP process for the AVP motor vehicle 719 can begin from there.

Another motor vehicle 721 is located within the region 711. A trajectory of the AVP motor vehicle 719 is shown by an arrow with the reference sign 723. A trajectory of the other motor vehicle 721 is shown by the reference sign 725.

For the sake of overview, a coordinate system 727 comprising an abscissa 729 and an ordinate 731 is shown. The abscissa 729 represents the x-axis; the ordinate 731 represents the y-axis. An orientation of the AVP motor vehicle 719 and the motor vehicle 721, respectively, is defined by an angle 733 φ. Thus, a pose of a motor vehicle can be determined by the coordinate system 727 by way of the coordinates x, y and φ.

The AVP motor vehicle 719 is identified on the infrastructure side according to the concept described here. In this case, the environment sensors 703 to 709 detect the two motor vehicles 719, 721, wherein, based on the recording, that is to say based on the corresponding monitoring data, a respective motor vehicle speed for the AVP motor vehicle 719 and for the other motor vehicle 721 are determined on the infrastructure side. The AVP motor vehicle 719 determines its own motor vehicle speed on the motor vehicle side and sends it directly to the infrastructure and/or sends it to a backend, which then sends the motor vehicle speed to the infrastructure.

The motor vehicle speed determined on the motor vehicle side and the motor vehicle speed determined on the infrastructure side are thus available on the infrastructure side. The motor vehicle speed of the AVP motor vehicle 719 determined on the motor vehicle side is compared with the motor vehicle speeds of the AVP motor vehicle 719 and the other motor vehicle 721 determined on the infrastructure side. The AVP motor vehicle 719 can be identified based on the comparison, which is explained in more detail below with reference to FIG. 8.

Figure 8:
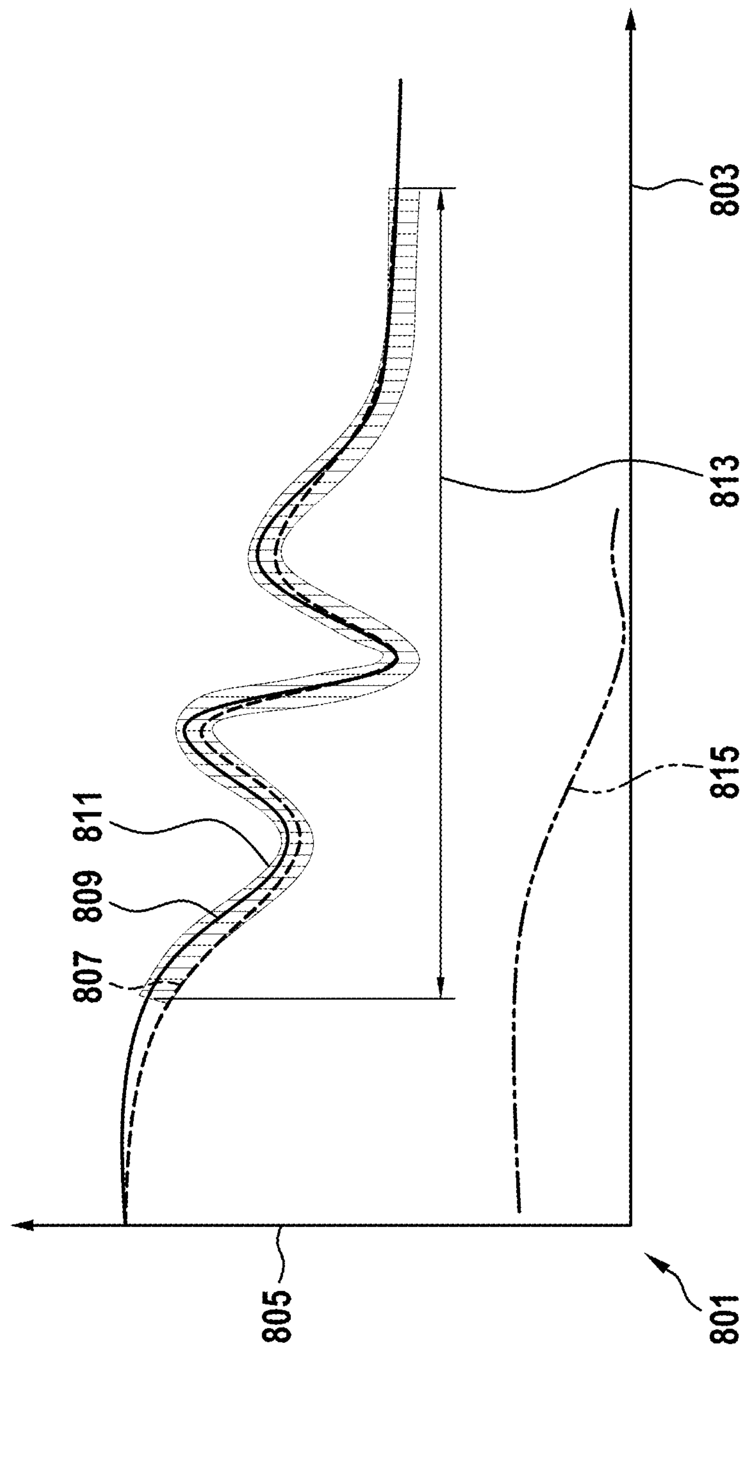

FIG. 8 shows a graph 801 comprising an abscissa 803 and an ordinate 805. The abscissa 803 has seconds as the unit, that is to say it represents a time. A motor vehicle speed is plotted on the ordinate 805, that is to say it has m/s as the unit.

The graph 801 shows three speed profiles: a first curve 807 showing a speed profile of the vehicle speed of the AVP motor vehicle 719 determined on the infrastructure side. The reference sign 809 indicates a second curve showing a speed profile of the motor vehicle speed of the AVP motor vehicle 719 determined on the motor vehicle side. The reference sign 811 indicates a tolerance interval. The reference sign 811 indicates a predetermined tolerance interval 811, within which the first curve 807 lies. In order to ensure a positive correlation between speed profiles determined on the infrastructure side and the speed profile determined on the motor vehicle side, the speed profile determined on the motor vehicle side must lie within the predetermined tolerance interval 811. This is particularly true for a predetermined time or for a predetermined time interval 813.

Furthermore, a third curve with the reference sign 815 is shown, which characterizes a temporal speed profile of the motor vehicle speed of the other motor vehicle 815, this speed profile having been determined on the motor vehicle side.

Since the speed of the other motor vehicle 721 is not within the tolerance window or the tolerance interval 811, there is no correlation and so the other motor vehicle 721 is not identified as the AVP motor vehicle 719. On the other hand, the speed profile 809 lies within the predetermined tolerance interval 811 for the predetermined time 813, and so there is a correlation here. Accordingly, the AVP motor vehicle 719 is identified as the motor vehicle that was detected based on the monitoring data.

The concept described here is based for example on a comparison of the relative movement data (first driving behavior) of the AVP motor vehicle with a second or further driving behavior of a motor vehicle detected by the infrastructure environment sensor system or of a plurality of motor vehicles detected by the infrastructure environment sensor system, based on monitoring data of the infrastructure environment sensor system. The concept is illustrated in FIG. 8 using the example of the motor vehicle speed. In addition to or instead of the vehicle speed, the principle can be applied to one or more other driving behavior parameters, such as the orientation of the AVP motor vehicle φ, the (relative) positions x, y, the curvature of the motor vehicle trajectory, the associated temporal changes or a combination thereof.

For example, pattern matching is carried out to identify the AVP motor vehicle at the motor vehicle speeds determined by the infrastructure and by the motor vehicle, respectively, vI refers to the motor vehicle speed determined on the infrastructure side. vK denotes the motor vehicle speed determined on the motor vehicle side. The two values determined for vI and vK both correspond approximately to the actual motor vehicle speed v. The differences between v, vI and vK are due for example to inherent limitations in the accuracy of the sensors used to determine the motor vehicle speed. For example, the similarity of vI and vK is assessed within a time interval Δt according to a predefined metric. For example, an acceptance window 811 for a positive correlation defines the maximum permissible difference between the two motor vehicle speeds along the time t for a particular time, the time interval 813. Other metrics can be defined as the integrated difference of |vI−vK| for the entire time interval Δt, which must not exceed a predefined difference threshold value Tmax. The features of the unique algorithm can be selected according to the accuracy requirements for the application in such a way that a non-associated third-party vehicle with the speed vT does not result in a positive correlation by mistake. The time base t between vI and vK does not need to be absolutely synchronized for successful pattern matching. A shifted time base of the AVP motor vehicle to be identified and the infrastructure results in a shift of the two curves vI and vK. Mathematical methods such as autocorrelation can then be used to identify the similarity between the two curves. This means for example that if the absolute time between the AVP motor vehicle and infrastructure is not synchronized, the curves, for example for the speed profile recorded by the AVP motor vehicle and infrastructure, respectively, will exhibit a shift on the x-axis (time axis) with respect to one another. Mathematical methods can then still be used to determine a correlation of the curves.

The AVP motor vehicle is particularly capable of measuring its own relative movement at a high frequency, for example in an order of magnitude of 100 Hz. The relative movement is characterized by the pose (x, y and orientation φ) and the change in the pose over time. The motor vehicle speed, the acceleration or deceleration, the curvature of the trajectory driven and similar movement features are sampled. The infrastructure environment sensor system monitors the region within which the AVP motor vehicle and potentially other motor vehicles are located or driving. The infrastructure environment sensor system thus records the motor vehicles located or driving within the region of the parking area and outputs monitoring data based on the recording or monitoring. Based on the monitoring data, the same features of the motor vehicles detected on the infrastructure side and located within the region are determined on the infrastructure side. These features, that is to say the driving behavior parameters, are compared with the driving behavior parameters that the AVP motor vehicle itself has determined. The corresponding driving behavior parameters are compared for example using a predefined metric. For example, the metric is selected according to the accuracy of the various measuring systems (motor vehicle sensors and infrastructure environment sensor system) and the requirements for a positive correlation. With this concept, both a positive alignment of the AVP motor vehicle and a negative alignment of third-party motor vehicles can be achieved.

What is claimed is:

1. A method for identifying an Automated Valet Parking (AVP) motor vehicle for an AVP process, comprising the steps of:

infrastructure-side reception of driving behavior data which describe a first driving behavior of an AVP motor vehicle that is manually guided within a region of a parking area monitored by an infrastructure environment sensor system;

infrastructure-side reception of monitoring data based on the monitoring of the region by the infrastructure environment sensor system;

infrastructure-side processing of the monitoring data in order to detect on the infrastructure side, based on the monitoring data, a motor vehicle located within the region monitored by the infrastructure environment sensor system;

in the case of infrastructure-side detection of a motor vehicle located within the region based on the monitoring data, infrastructure-side determination, based on the monitoring data, of a second driving behavior of the motor vehicle detected on the infrastructure side;

infrastructure-side comparison of the first driving behavior with the second driving behavior; and infrastructure-side identification, based on the comparison, of the AVP motor vehicle as the motor vehicle detected on the infrastructure side, based on the comparison on the infrastructure side, a difference between the first driving behavior and the respective driving behavior of the motor vehicle detected on the infrastructure side is determined on the infrastructure side, wherein, based on the determined difference, the AVP motor vehicle is identified on the infrastructure side as the motor vehicle detected on the infrastructure side.

2. The method of claim 1, wherein, in the case of infrastructure-side detection of a plurality of motor vehicles located within the region based on the monitoring data, a respective driving behavior of the plurality of motor vehicles detected on the infrastructure side is determined on the infrastructure side based on the monitoring data, wherein the respective driving behaviors are in each case compared on the infrastructure side with the first driving behavior, wherein, based on the respective comparisons, the AVP motor vehicle is identified on the infrastructure side as one of the plurality of motor vehicles detected on the infrastructure side.

3. The method of claim 1, wherein a time profile of the determined difference is determined on the infrastructure side, wherein, based on the determined time profile of the determined difference, the AVP motor vehicle is identified on the infrastructure side as a motor vehicle detected on the infrastructure side.

4. The method of claim 3, wherein the AVP motor vehicle is identified on the infrastructure side as a motor vehicle detected on the infrastructure side if the time profile of the determined difference remains within a predetermined tolerance interval for a predetermined time.

5. The method of claim 1, wherein the AVP motor vehicle is identified on the infrastructure side as a motor vehicle detected on the infrastructure side if the determined difference is less than or less than or equal to a predetermined difference threshold value.

6. The method of claim 5, wherein the driving behavior is described by at least one of the following driving behavior parameters: location, speed, acceleration, jolt, pose, orientation, curvature of a motor vehicle trajectory, time profile of the location, time profile of the speed, time profile of the acceleration, time profile of the jolt, time profile of the pose, time profile of the orientation, time profile of a motor vehicle trajectory.

7. The method of claim 6, wherein the difference determined on the infrastructure side is a respective difference between the corresponding driving behavior parameters describing the respective driving behavior.

8. The method of claim 7, wherein, in the case of identification on the infrastructure side of the AVP motor vehicle as a motor vehicle detected on the infrastructure side, a confidence for the identification is determined on the infrastructure side, wherein, based on the determined confidence, a different identification method is carried out on the infrastructure side in order to re-identify the AVP motor vehicle as the motor vehicle detected on the infrastructure side.

9. The method of claim 8, wherein the driving behavior data are received on the infrastructure side from the AVP motor vehicle via a radio connection with the AVP motor vehicle and/or wherein the driving behavior data are received on the infrastructure side from a backend.

10. A method for identifying an AVP motor vehicle for an AVP process, comprising the steps of:

motor-vehicle-side determination of driving behavior data which describe a first driving behavior of the AVP motor vehicle that is manually guided within a region of a parking area monitored by an infrastructure environment sensor system;

motor-vehicle-side reception of monitoring data based on the monitoring of the region by the infrastructure environment sensor system;

motor-vehicle-side processing of the monitoring data in order to detect on the motor vehicle side, based on the monitoring data, a motor vehicle located within the region monitored by the infrastructure environment sensor system;

in the case of motor-vehicle-side detection of a motor vehicle located within the region based on the monitoring data, motor-vehicle-side determination, based on the monitoring data, of a second driving behavior of the motor vehicle detected on the motor vehicle side;

motor-vehicle-side comparison of the first driving behavior with the second driving behavior; and motor-vehicle-side identification, based on the comparison, of the AVP motor vehicle as the motor vehicle detected on the motor vehicle side, based on the comparison on the motor-vehicle-side, a difference between the first driving behavior and the respective driving behavior of the motor vehicle detected on the motor-vehicle-side is determined on the motor-vehicle-side, wherein, based on the determined difference, the AVP motor vehicle is identified on the motor-vehicle-side as the motor vehicle detected on the motor-vehicle-side.

11. A device which performs the method of claim 1.

12. A motor vehicle comprising the device of claim 11.

13. A non-transitory machine-readable storage medium on which a computer program is stored, the computer program comprising instructions which, when executed by a computer, cause the computer to carry out the method of claim 1.

14. A system for identifying an AVP motor vehicle for an AVP process, said system comprising a device as claimed in claim 11, which is configured to carry out all steps of the method as claimed in claim 1, and an infrastructure environment sensor system which is configured to monitor a region of a parking area and to output monitoring data based on the monitoring to the device.

* * * * *